United States Patent [19]
Corrigan

[11] Patent Number: 5,566,359
[45] Date of Patent: Oct. 15, 1996

[54] PREVENTION OF SIMULTANEOUS TRANSMITTER OPERATION IN A GROUND RADIO TRANSMITTING AND RECEIVING APPARATUS

[76] Inventor: Nigel Corrigan, 4 Shearwater, Orton Wistow, Peterborough PE2 6YW, England

[21] Appl. No.: 338,534

[22] PCT Filed: Jun. 4, 1993

[86] PCT No.: PCT/GB93/01189

§ 371 Date: Dec. 5, 1994

§ 102(e) Date: Dec. 5, 1994

[87] PCT Pub. No.: WO93/26098

PCT Pub. Date: Dec. 23, 1993

[30] Foreign Application Priority Data

Jun. 6, 1992 [GB] United Kingdom ............... 9212110

[51] Int. Cl.⁶ .................................................. H04B 1/44
[52] U.S. Cl. .............................. 455/78; 455/58.2; 455/98
[58] Field of Search ........................... 455/34.2, 58.2, 455/78, 79, 98, 99

[56] References Cited

U.S. PATENT DOCUMENTS 4,494,244  1/1985  Arndt et al. .................. 455/78
4,549,309  10/1985 Corrigan ...................... 455/78
4,551,854  11/1985 Rutty et al. .................. 455/78
4,932,071  6/1990  Arndt .

FOREIGN PATENT DOCUMENTS 2083979  of 0000  United Kingdom .
2191659  12/1987  United Kingdom .

*Primary Examiner*—Andrew I. Faile
*Attorney, Agent, or Firm*—Henderson & Sturm

[57] ABSTRACT

Simultaneous transmitter operation in a radio network is prevented by monitoring the signal received at the control position from the transmitter of the apparatus, this signal being delayed by the passage down land lines connecting the control position to its transmission antenna and the receiver to its control position. If a signal is received within a known time period from the time of commencement of a transmit action then it is assumed to be a signal from a remote transmitter and the operation of the local transmitter is aborted to prevent interference. The system is particularly useful where land lines and consequent time delays are present between the control position and the transmitter and the receiver and the control position.

7 Claims, 4 Drawing Sheets

PREVENTION OF SIMULTANEOUS TRANSMITTER OPERATION IN A GROUND RADIO TRANSMITTING AND RECEIVING APPARATUS

BACKGROUND OF THE INVENTION—FIELD OF THE INVENTION

The present invention relates to ground transmitting and receiving apparatus and more particularly to means for preventing simultaneous transmission between two or more of such apparatus.

DESCRIPTION OF THE PRIOR ART

UK Patent No. 2083979, in the name of the present applicant, describes a means of blocking the operation of a second radio transmitter when a first transmitter is occupying the frequency, the purpose being to prevent coincident and conflicting transmissions in a simplex radio network. The effectiveness of such an arrangement, in preventing coincident transmissions, depends on certain variables such as the time for the first transmitter to produce RF energy following a press-to-transmit action, and the time for the blocking apparatus of the second receiver to detect this energy. If the second press-to-transmit is made prior to detection of RF resulting from the first then a Conflict of both transmissions will result. The longer these delays then the less effective the conflict prevention system. In semi-duplex Air Traffic Control ground installations, where a full time receiver monitors associated transmitter operation, land lines are frequently used to transfer control and voice signals from a remote operators site. These land lines and their associated switching apparatus introduce relatively lengthy delays which adversely influence the effectiveness of the apparatus of UK Patent No. 2083979. A means of minimising the effect of any such delays would improve the apparatus of UK Patent No. 2083979 when applied to semi-duplex radio systems. In essence,: such an arrangement may have stored, in electronic memory, the detected time period between press-to-transmit application and consequent response of the associated receiver. In operation, any receiver response following a press-to-transmit action, but which occurs before the stored time period has expired, must be from an RF source which has preceded that from the associated transmitter. In this case it is beneficial to prevent, or terminate, operation of the associated transmitter, thereby allowing the preceding radio signal to be monitored without disruption.

SUMMARY OF THE INVENTION

Accordingly, and distinguished over UK Patent No. 2083979, the present invention provides a means of electronically determining the time period between a press-to-transmit application and subsequent receiver response of the equipment in which the invention is incorporated, a means of electronically storing this time period less a proportion, say 10%, a means of initiating the resultant time period at application of a press-to-transmit action, a means of monitoring the expiry of the time period, and a means of disconnecting the press-to-transmit control signal from the transmitter when subsequent receiver activity is detected prior to expiry of the known period.

The present invention provides apparatus for preventing simultaneous transmitter operation in a radio transmitting and receiving apparatus comprising means for detecting the commencement at a control position of a transmission control switch operation (PTT) in said apparatus, means for starting a timer, means for detecting the receipt at the control position of a signal received by said receiver of said apparatus, means for disabling the transmitter if the receipt of the signal at the control position occurs within a predetermined time interval from the commencement of transmission, and in which there is provided means for deriving the predetermined time interval comprising which comprises means for switching on the transmitter of said apparatus at the control position to generate a transmission signal, means for activating the timer at the time of switching on of the transmitter, means for detecting at the control position the transmission signal received as a result of the transmitter operation, means for storing the time period between switching on of the transmitter and the reception of the transmission signal at the control position, and means for subtracting from the stored time period a calibration window (CW) period to form the predetermined time interval.

The present invention provides a radio transmitting and receiving apparatus storage means for storing a delay time period, means for detecting the presence of an incoming signal and for inhibiting the transmitter if said incoming signal occurs within the delay time period from the time of commencement of any press-to-transmit action.

Preferably the means for inhibiting the transmitter comprises a relay.

Preferably the apparatus includes a micro processor to control operation of the relay.

The present invention also provide a method of preventing simultaneous transmitter operation in a radio transmitting and receiving apparatus comprising the steps of:

(a) detecting the commencement at a control position of a transmission control switch operation (PTT) in said apparatus, (b) starting a timer, (c) detecting the receipt at the control position of a signal received by said receiver of said apparatus, (d) disabling the transmitter if the receipt of said signal at the control position occurs within a predetermined time interval from the commencement of transmission.

BRIEF DESCRIPTION OF THE DRAWINGS

Embodiments of the present invention will now be described, by way of example with reference to the accompanying drawings in which.

DESCRIPTION OF THE PREFERRED EMBODIMENTS

Figure 1:
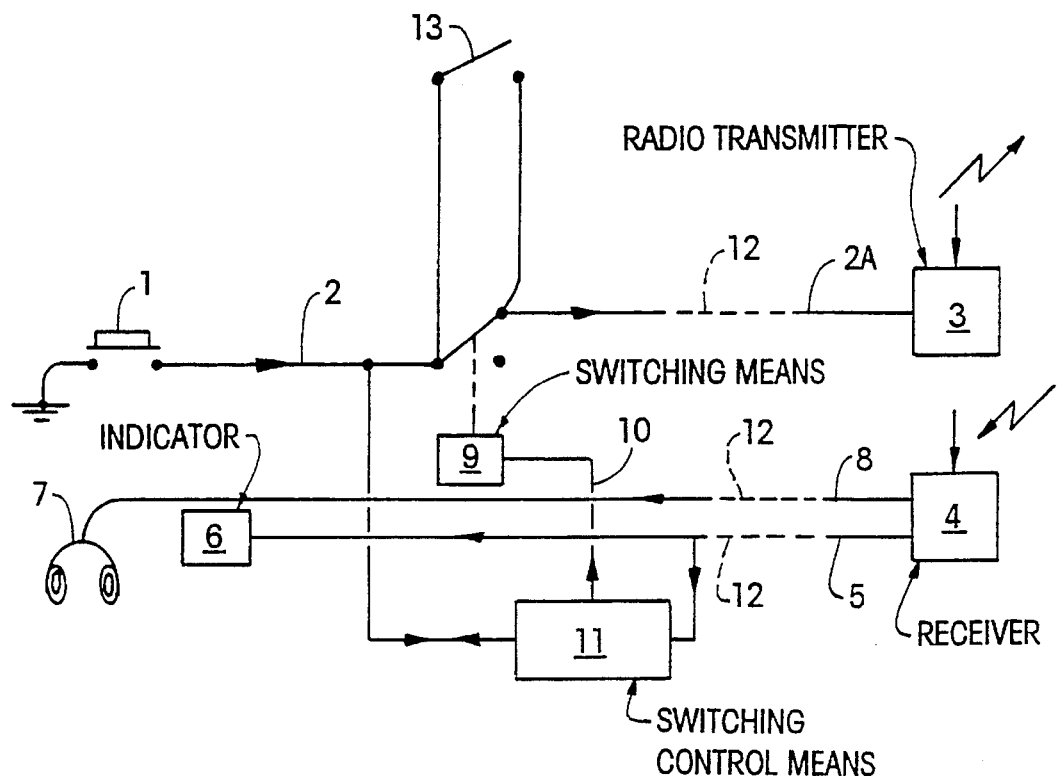
FIG. 1 shows in block diagrammatic form circuitry for the present invention.

Reference to FIG. 1 shows press-to-transmit switch 1 and transmitter enable line 2—2A which controls radio transmitter 3. Co-located receiver 4 responds to the operation of radio transmitter 3 from switch 1 and then outputs a signal 5 which is normally used to operate an indicator 6. Any audio signal is routed to the operator's headset 7 through separate lines 8. Thus signal 5 will be produced following either the operation of press-to-transmit switch 1 and consequent transmission, or the reception, through receiver 4 only, of an aircraft transmission. Switching means 9 is included by which switch 1 may be automatically connected or disconnected to the transmitter 3. Signals from switch I and signal 5 arc routed to time period detection, storage and switching control means 11 configured to operate as follows. Operation of press to transmit switch 1, with receiver activity signal 5 already present, causes a control signal 10 to operate switching means 9 and disconnect switch 1 from transmitter 3 for the duration of signal 5. Additionally, and in operation, control means 11 monitors the normal time delay between application of switch I and consequent response of indicator 6, delayed by lines 12, to determine the overall delays inherent in the associated transmitter receiver system. These delays are stored in memory by control means 11 and are largely produced by land lines 12 and their associated switching. Then, following an application of switch 1, and if signal 5 appears a known period prior to the stored time delay then control signal 10 is applied to switch means 9. This causes switching means 9 to disconnect the transmitter control line 2A from switch 1. Means for manually disabling switching means 9 include, as part of control means 11, a configuration whereby the second of two press-to-talk actions of switch 1 within a known time period is detected to cause control means 11 to disable switching means 9 for the duration of the second action of switch 1. Also included is switch 13 whereby the operator may manually disable the control of switching means 9. Time period detection, storage and switching control means 11 may be any suitable commercially available micro-controller or an electronically programmable logic device. The operational time period between application of switch i and the consequent response of indicator 6 may be determined by periodically and automatically applying a brief transmitter enable signal from control means 11 to line 2. This periodic calibration caters for any variations in the press-to-transmit/receiver response time which may be caused by the changing characteristics of switching equipment associated with lines 12. Here, validation that the response of indicator 6 is not the result of receiver activity unrelated to the operation of switch 1, and thus cause incorrect calibration, may be determined, through control means 11, by comparing the two time periods of line 2A and signal 5.

Figure 2:
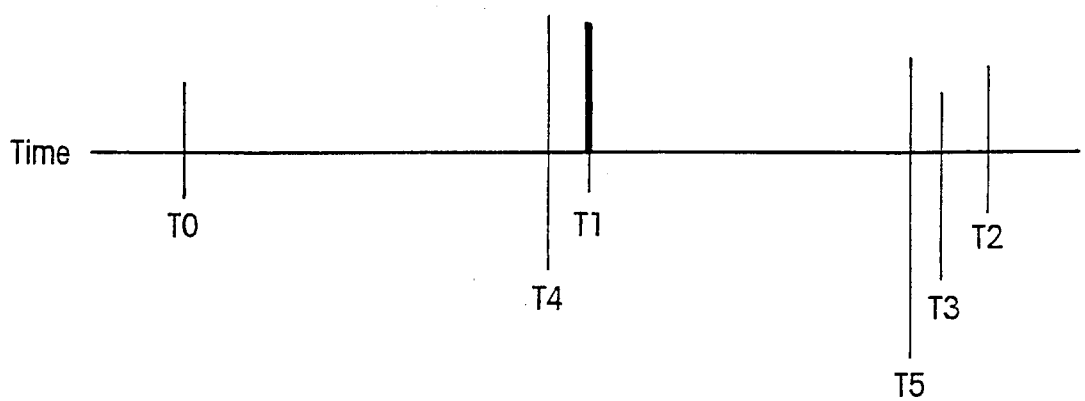
FIG. 2 shows a timing diagram associated with the circuitry of FIG. 1.

FIG. 2 shows a diagrammatic presentation of time periods of interest where T0 is the time of a press-to-transmit action. T1 is both the moment of transmitter operation and consequent response of the co-located receiver. T2 is the moment of consequent receiver activity indication at the operator's position. Time period T0–T3 is the automatically calibrated delay period derived from the normal period T0–T2. Thus, and in operation, if T2 occurs following T3 then T2 is assumed to be the result of the press to transmit action at T0 and the transmission is allowed to continue. However, any receiver activity indication which occurs prior to T3 must be the result of an aircraft transmission initiated at, for example, T4 and preceding the transmission T1. From T4 the receiver activity indication at the operator's position would occur at T5, prior to T3, and indicate the presence of a second and conflicting transmission over that initiated at T0. To prevent this conflict, and at T5, the effect of T0 is terminated to allow the operators reception of transmission T4 to continue without disruption.

Figure 3:
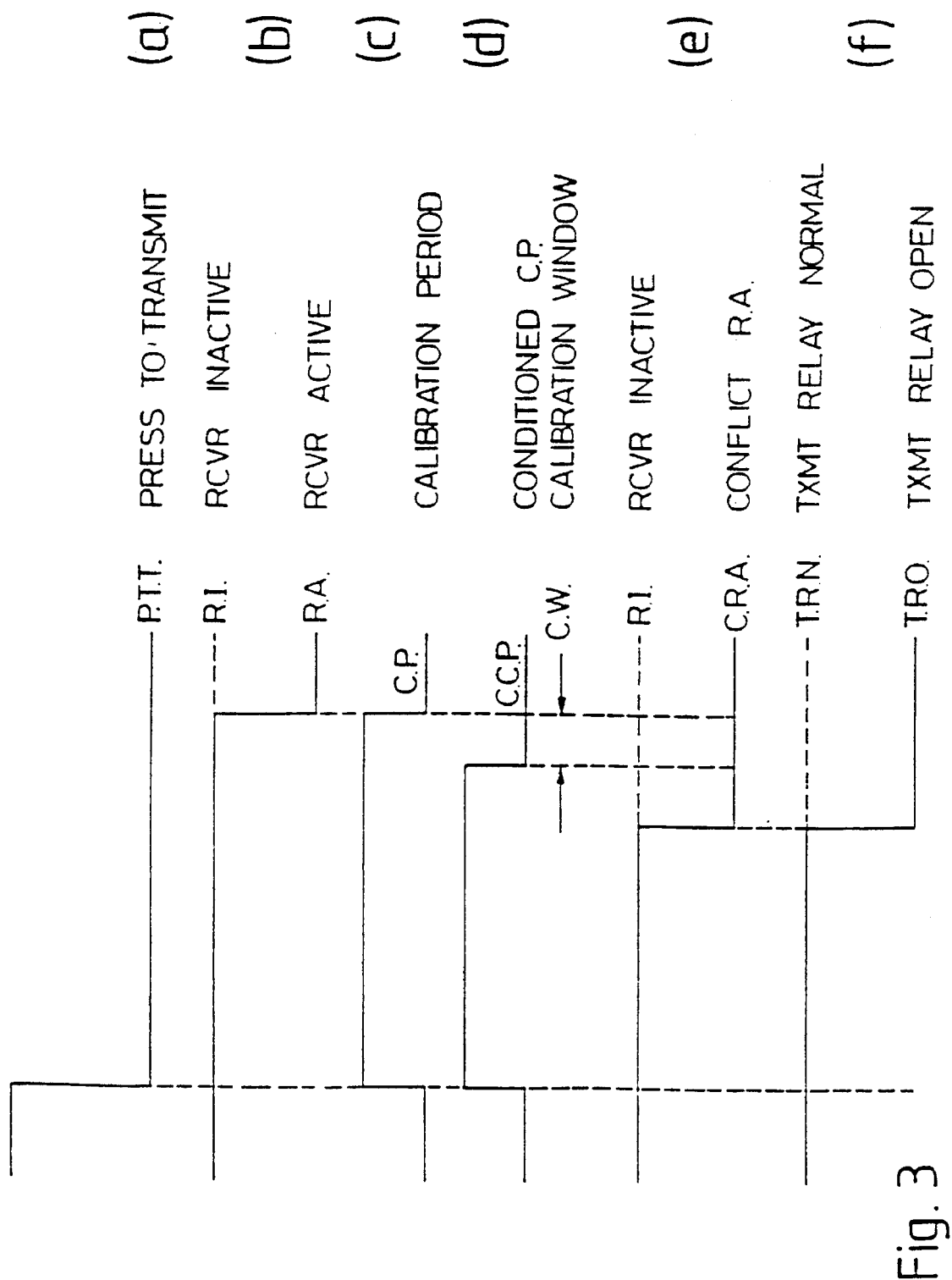
FIG. 3 shows a further timing diagram illustrating transmitter periods and the calibration window.

FIG. 3 shows a further diagrammatic representation illustrating the sequence of transmitter on periods and showing the calibration window and the operation of the transmit relay.

FIG. 3(a) shows the switching of the press-to-transmit (PTT) switch and FIGS. 3(b) and 3(c) show the receiver active (RA) and calibration period (CP). FIG. 3(d) shows the effect of the calibration window (CP). FIG. 3(e) shows the effect of a conflict receiver active signal (CRA) and FIG. 3(f) shows the effect of the signal (CRA) to open the transmit relay (TRO)

The calibration window (CW) is predetermined to be a selected small percentage (for example 10%) of the time measured period and is in effect subtracted from the time period once measured. This ensures that the transmitter can not be disabled by reception of its own transmitted signal which might be so if the calibration window was not subtracted from the time period.

Figure 4:
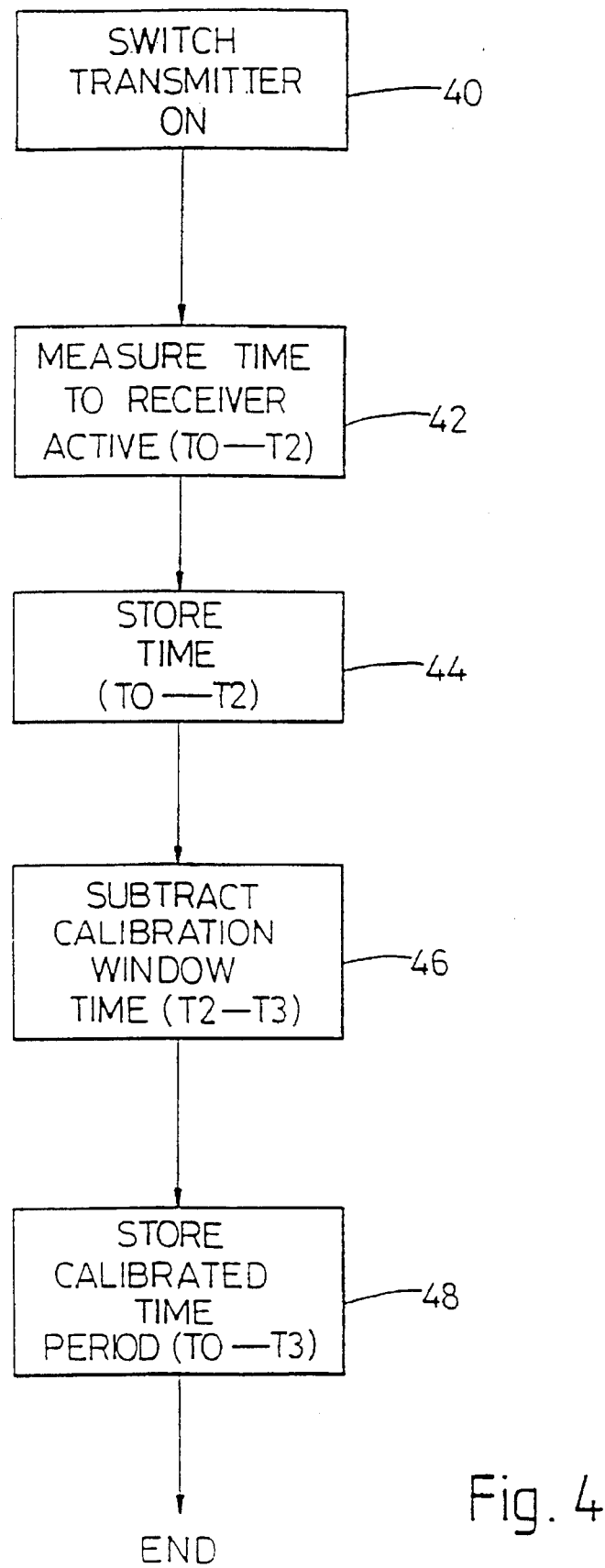
FIG. 4 shows a flow diagram for setting up the calibration period.

With reference to FIG. 4 if a micro controller 11 is used the flow diagram for setting the calibration period may be as shown.

At any inactive period as determined by the operator or at predetermined intervals a calibration procedure may be commenced.

The transmitter is switched on (40) and the time taken for the receiver to receive the transmitter signal (T0–T2) is measured (62) and stored (44). A set percentage of the time (T0–T2) is subtracted (46) to give the conditioned calibration period (T0–T3) and this period is stored (48) and subsequently used for controlling the operation.

Figure 5:
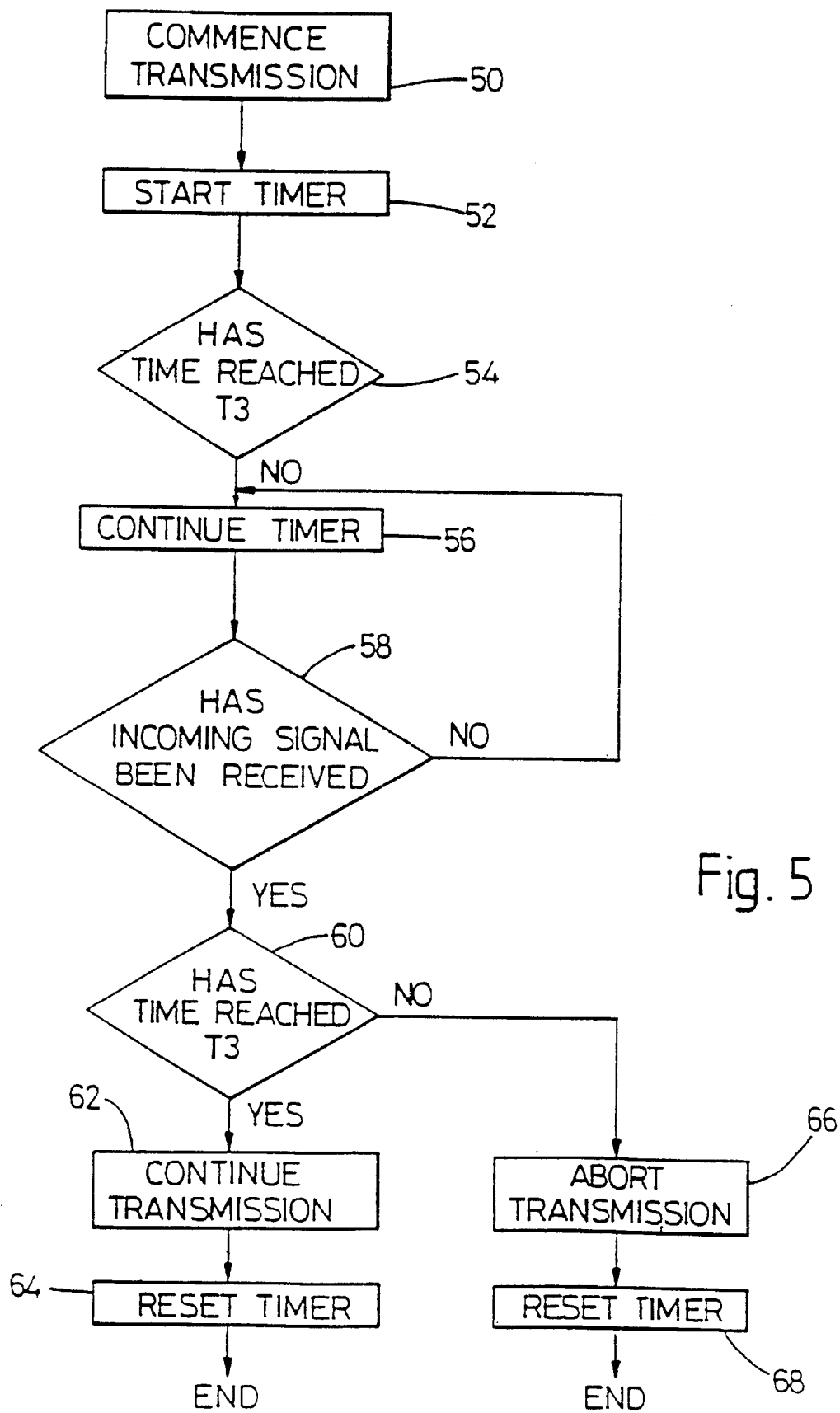
FIG. 5 shows a flow diagram for the operation of the present invention.

With reference to FIG. 5 in simplified form the flow diagram illustrates one possible method for controlling the operation of the circuitry of the present invention.

When the transmitter commences operation (PTT) (50) the timer is started (52) and continues operation. The time is continuously checked (54) until it reaches time T3. If the time has not reached T3 the timer activity is continued (56). As the timer counts the receiver is continuously monitored to see if a received signal has been detected (58).

If no signal is detected the timer is allowed to continue but if a signal is detected the timer is interrogated (60) to see if it has reached T3. If it has then the transmission is allowed to continue (62) and the timer is reset (64).

If it has not then the transmission is aborted (66) and the timer reset (68).

I claim:

1. A method of preventing simultaneous transmitter operation in a radio transmitting and receiving apparatus comprising:
   (a) detecting commencement at a radio transmitter control position of a transmission control switch operation in said apparatus,
   (b) starting a timer,
   (c) detecting receipt at the radio transmitter control position of a signal received by a receiver of said apparatus,
   (d) disabling a transmitter of said apparatus if the receipt of said signal at the radio transmitter control position occurs within a predetermined time interval from the commencement of transmission and
   (e) deriving the predetermined time interval by the following steps:
      (i) switching on the transmitter of said apparatus at the radio transmitter control position to effect transmitter operation,
      (ii) activating the timer at the time of switching on of the transmitter,
      (iii) detecting at the radio transmitter control position the signal received as a result of said transmitter operation, (iv) storing the time period between switching on of the transmitter and the reception of the signal at the radio transmitter control position, and (v) subtracting from the stored time period a calibration window period to form the predetermined time interval.

2. A method as claimed in claim 1 in which the predetermined time interval is derived automatically at fixed intervals during a day.

3. A method as claimed in claim 1 in which the predetermined time interval is derived at periods during which receiver activity is not anticipated.

4. An apparatus for preventing simultaneous transmitter operation in a radio transmitting and receiving apparatus comprising:

(a) means for detecting commencement at a radio transmitter control position of a transmission control switch operation in said apparatus;

(b) means for starting a timer;

(c) means for detecting receipt at the radio transmitter control position of a signal received by a receiver of said apparatus;

(d) means for disabling a transmitter of said apparatus upon receipt of a signal at the radio transmitter control position within a predetermined time interval from commencement of transmission; and (e) means for deriving the predetermined time interval comprising:

(i) means for switching on the transmitter of said apparatus at the radio transmitter control position to effect transmitter operation to generate a transmission signal, (ii) means for activating the timer at a time of switching on of the transmitter, (iii) means for detecting at the radio transmitter control position a transmission signal received as a result of a transmitter operation, (iv) means for storing a time period as a stored time period between switching on of the transmitter and the reception of the transmission signal at the radio transmitter control position, and (v) means for subtracting from the stored time period a calibration window period to form the predetermined time interval.

5. The apparatus as claimed in claim 4 wherein the means for deriving the predetermined time interval comprises means for automatically activating at fixed intervals during a day.

6. The apparatus as claimed in claim 4 wherein the means for deriving the predetermined time interval comprises means for activating during predetermined time periods.

7. The apparatus as claimed in claim 6 wherein said predetermined time periods comprise periods during which receiver activity from outside sources is not anticipated.

* * * * *